(12) United States Patent
Princen et al.

(10) Patent No.: US 6,636,830 B1
(45) Date of Patent: Oct. 21, 2003

(54) SYSTEM AND METHOD FOR NOISE REDUCTION USING BI-ORTHOGONAL MODIFIED DISCRETE COSINE TRANSFORM

(75) Inventors: John Peter Princen, Cupertino, CA (US); Ming Hong Chan, San Jose, CA (US)

(73) Assignee: Vialta Inc., Fremont, CA (US)

( * ) Notice: Subject to any disclaimer, the term of this patent is extended or adjusted under 35 U.S.C. 154(b) by 448 days.

(21) Appl. No.: 09/721,481

(22) Filed: Nov. 22, 2000

(51) Int. Cl.[7] .............................................. G10L 19/02
(52) U.S. Cl. ...................... 704/204; 704/205; 704/500
(58) Field of Search ................................ 704/204, 205, 704/500

(56) References Cited

PUBLICATIONS

Henrique Malvar, "Fast Algorithms for Orthogonal and Biorthogonal Modulated Lapped Transforms," Proc. IEEE Symp. Advances in Digital Filtering and Signal Processing, p. 159–163, Jun. 1998.*
J. D. Johnston and A. J. Ferreira, "Sum–Difference Stereo Transform Coding," Proc. IEEE ICASSP 1992, vol. 2, p. 569–572, Mar. 1992.*
John Peter Princen and J. D. Johnston, "Audio Coding with Signal Adaptive Filterbanks," Proc. IEEE ICASSP 1995, vol. 5, p. 3071–3074, May 1995.*
Shinfun Cheung and Jae S. Lim, "Incorporation of Biorthogonality into Lapped Transforms for Audio Compression," Proc. IEEE ICASSP 1995, Vo.. 5, p. 3079–3082, May 1995.*
Henrique S. Malvar, "Biorthogonal and Nonuniform Lapped Transforms for Transform Coding with Reduced Blocking and Ringing Artifacts," IEEE Trans. Signal Processing, vol. 46, p. 1043–1053, Apr. 1998.*
"J. Princen and A. Bradley, Filter Bank Design Based on Time Domain Aliasing Cancellation", IEEE Transactions on Acoustics, Speech and Signal Processing. Oct. 1986.
J. Princen, A. Johnson and A. Bradley, "Subband/Transform Coding Using Filterbank Designs Based on Time Domain Aliasing Cancellation", Proc, ICASSP 1987.
B. Elder, "Coding of Audio Signals with Overlapping Block Transform and Adaptive Window Functions", Frequenz, vol. 43, 1989.
J.D. Johnston, "Estimation of Perceptual Entropy Using Noise Making Criteria", IEEE ICASSP, 1988.
H. Malvar, "Signal Processing with Lapped Transforms", Artech House, 1992.

* cited by examiner

Primary Examiner—Tālivaldis Ivars Šmits
(74) Attorney, Agent, or Firm—Stevens Law group; David R. Stevens (57) ABSTRACT

The invention provides a perceptual audio signal compression system and method. One aspect of the invention described herein includes transforming the signal into a plurality of bi-orthogonal modified discrete cosine transform (BMDCT) frequency coefficients using a bi-orthogonal modified discrete cosine transform; quantizing the BMDCT frequency coefficients to produce a set of integer numbers which represent the BMDCT frequency coefficients; and encoding the set of integer numbers to lower the number of bits required to represent the BMDCT frequency coefficients.

53 Claims, 8 Drawing Sheets

SYSTEM AND METHOD FOR NOISE REDUCTION USING BI-ORTHOGONAL MODIFIED DISCRETE COSINE TRANSFORM

BACKGROUND

The invention relates in general to digital signal processing of audio signals, and more particularly, to efficiently encoding and decoding audio signals intended for human perception.

There is a considerable interest in the field of signal processing to discover methods that minimize the amount of information required to adequately represent a given signal. By reducing the amount of required information, signals may be transmitted over communication channels with lower bandwidth, or stored in less space. The informational requirements, or minimum amount of information needed for a digital signal processing method may be defined by the minimum number of binary bits required to represent a signal.

A variety of generally adequate coding techniques for audio signals are known. For example, two protocols, which perform coding for audio signals, are AC3 and MP3. Both AC3 and MP3 protocols utilize a modified discrete cosine transform (MDCT) to encode and decode audio signals. A modified discrete cosine transform is an orthogonal lapped transform, based on the idea of time domain aliasing cancellation (TDAC). One characteristic of an orthogonal transform is that it utilizes the same transform window at both the encoder and decoder.

In a typical design for coding of audio signals, encoders use high precision arithmetic to encode the audio signal. If MDCT is used to transform the audio signals, high precision arithmetic is also required at the decoder to perform the inverse transform. Utilizing such high precision arithmetic at both the encoder and the decoder generally requires a significant amount of memory storage space and processing power. Another characteristic of AC3 and MP3 protocols is that they utilize only two different window sizes for all MDCT transforms, limiting their flexibility and providing fewer possibilities when coding audio signals. Furthermore, the use of only two transform window sizes tends to limit the coding performance and sound quality of the audio signal.

A typical design for coding of audio signals, such as MP3 and AC3, may also include a stereo processing subsystem, which attempts to exploit both irrelevancy and redundancy in a stereo signal. One potential shortcoming with MP3 and AC3 is that they both use independent stereo processing subsystems to exploit irrelevancy and redundancy. Multiple approaches to stereo processing subsystems add to decoder complexity. Another limitation with the MP3 and AC3 independent stereo processing subsystem is that they both use a simple sum/difference stereo encoding method to exploit redundancy that is appropriate only if the dominant direction of the stereo signal is in the center.

Furthermore, efficient lossless coding is essential for achieving high compression. AC3 uses a relatively simple coding system based on Pulse Code Modulation (PCM) coding. MP3 uses a more sophisticated system which uses adaptive Huffman coding and a number of codebooks designed to code symbols with different distributions. However, both AC3 and MP3 lossless coding schemes have limitations which reduce their efficiency.

SUMMARY

The invention provides a system and method for efficient encoding and decoding audio signals intended for human perception that substantially eliminates or reduces certain disadvantages from previous digital signal processing systems and methods. The invention may include transforming the signal into a plurality of bi-orthogonal modified discrete cosine transform (BMDCT) frequency coefficients using a bi-orthogonal modified discrete cosine transform; quantizing the BMDCT frequency coefficients to produce a set of integer numbers which represent the BMDCT frequency coefficients; and encoding the set of integer numbers to lower the number of bits required to represent the BMDCT frequency coefficients.

The invention may also include generating an inverse BMDCT transform of the audio signal using low precision arithmetic at the decoder. Using this approach, less memory storage is required to represent the inverse BMDCT transform window. As a result, the decoder will operate more efficiently.

The invention may further include the use of one of three different window types to perform each BMDCT transform, providing better sound quality on the receiving end of the process.

The invention may further provide a unified approach to exploiting stereo irrelevancy and stereo redundancy. This simplifies the decoder by implementing only one algorithm for stereo signal processing.

The invention may also examine future sub-frames to determine the best window type to utilize for each BMDCT transform.

The invention may also include the use of a very flexible and efficient lossless coding system that uses a combination of Huffman coding and Pulse Coded Modulation (PCM) to code different parts of the spectrum. This would minimize the number of bits required to represent the audio signal.

DETAILED DESCRIPTION

Although examples of how to practice a perceptual audio signal compression system are given below, it will be appreciated, however, that this is illustrative of only one embodiment of the invention, and that there are a variety of ways to implement and construct the perceptual audio signal compression system and a variety of applications for such system.

Figure 1:
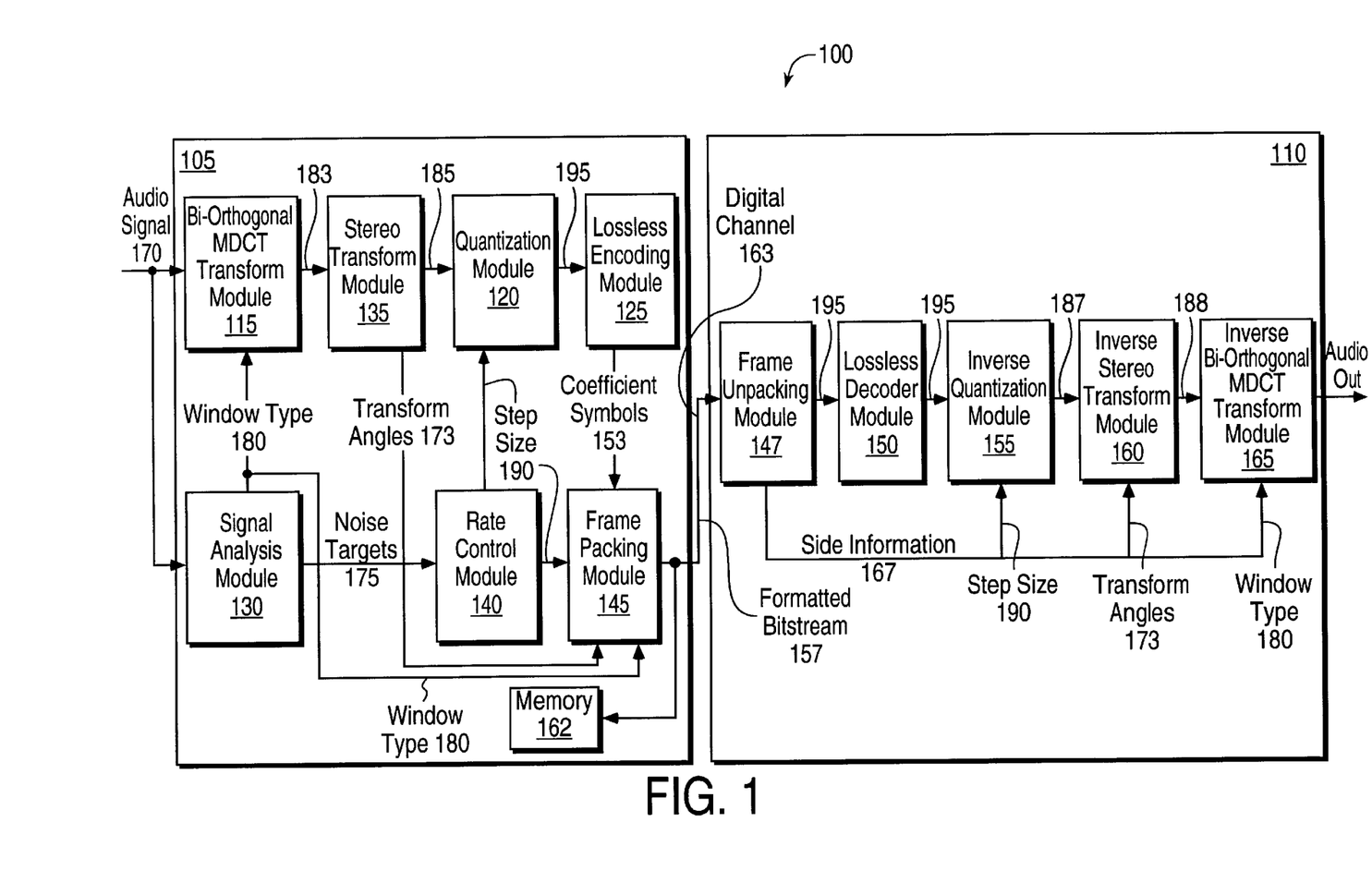
FIG. 1 is a block diagram of the perceptual audio signal compression system according to the invention.

FIG. 1 is a block diagram for one embodiment of the perceptual audio signal compression system 100. The perceptual audio signal compression system 100 is comprised of an encoder 105 and a decoder 110. The encoder 105 is comprised of a bi-orthogonal transform module 115, a quantization module 120, a lossless encoder module 125, a signal analysis module 130, a stereo transform module 135, a rate control module 140, and a frame packing module 145. The decoder 110 is comprised of a frame unpacking module 147, lossless decoder module 150, an inverse quantization module 155, an inverse stereo transform module 160 and an inverse bi-orthogonal transform module 165. It should be noted again, that the embodiment of the encoder 105 is just one possible way of encoding an audio signal 170. The general features and operation of system 100 will be described first, then particular details will be explained in greater length below.

The audio signal 170 simultaneously enters the bi-orthogonal transform module 115 and the signal analysis module 130. The signal analysis module 130 analyzes the audio signal 170 and determines a window type to use for each bi-orthogonal transform based on the characteristics of audio signal 170. The signal analysis module 130 also analyzes the audio signal 170 to determine a set of noise targets 175 where noise can be transparently introduced into the audio signal 170 to compress the audio signal 170. The bi-orthogonal transform module 115 receives the BMDCT window type information 180 from the signal analysis module 130 and transforms the audio signal 170 into multiple sets of BMDCT frequency coefficients 183 using a bi-orthogonal modified discrete cosine transform. Each set of BMDCT frequency coefficients 183 represents a window of the audio signal 170 in time. The BMDCT frequency coefficients 183 then enter the stereo transform module 135. The stereo transform module 135 performs a stereo transform on the BMDCT frequency coefficients 183 that may eliminate redundant and irrelevant information. The stereo transform module may eliminate all redundant and irrelevant information from the two channels.

The rate control module 140 receives the noise targets 175 generated by the signal analysis module 130. The rate control module 140 then uses the noise targets 175 along with constraints from a user, such as the required bit rate, and determines the step size 190 required to minimize the perceived noise while meeting the required bit rate. The step size information 190 is a set of values representing the step size across regions of the frequency spectrum. The quantization module 120 then receives the BMDCT frequency coefficients 185 from the stereo transform module 135 and the step size 190 information from the rate control module 140. The quantization module 120 then quantizes the BMDCT frequency coefficients 185 using uniform quantization, yielding quantized BMDCT frequency coefficients 195. The quantized BMDCT frequency coefficients 195 are a set of integers that represent the BMDCT frequency coefficients 185. The lossless encoder module 125 then receives the quantized BMDCT frequency coefficients 195 and losslessly encodes them, yielding coefficient symbols 153. The lossless encoder module 125 uses pulse code modulation and variable length Huffman encoding in an adaptive way to minimize the number of bits required to represent the quantized BMDCT frequency coefficients 195.

The frame packing module 145 then receives the coefficient symbols 153 from the lossless encoder module 125, the transform angles 173 from the stereo transform module 135, the window type 180 from the signal analysis module 130 and the step size information 190 from the rate control module 140. The frame packing module 145 packs the transform angles 173, the window type 180, the step size information 190 and the coefficient symbols 153 into a frame to produce a formatted bitstream 157 which represents the original audio signal 170. The resulting formatted bitstream 157 can be stored in memory 162 or transmitted over a digital channel 163.

To decode the formatted bitstream 157, the formatted bitstream 157 first enters the frame-unpacking module 147. The frame-unpacking module 147 then separates the formatted bitstream 157 into side information 167 and quantized BMDCT frequency coefficients 195. The quantized BMDCT frequency coefficients 195 then enter the lossless decoder module 150 which uses a collection of Huffman decoders to decode the quantized BMDCT frequency coefficients 195. The inverse quantization module 155 then receives the decoded quantized BMDCT frequency coefficients 195 and reconstructs the BMDCT frequency coefficients 187. Next, the inverse stereo transform module 160 receives the BMDCT frequency coefficients 187 and performs an inverse stereo transform to produce the BMDCT frequency coefficients 188. Finally, the BMDCT frequency coefficients 188 are received at the inverse bi-orthogonal transform module 165 and inversely transformed back into the original audio signal 170 using an inverse bi-orthogonal modified discrete cosine transform.

Figure 2:
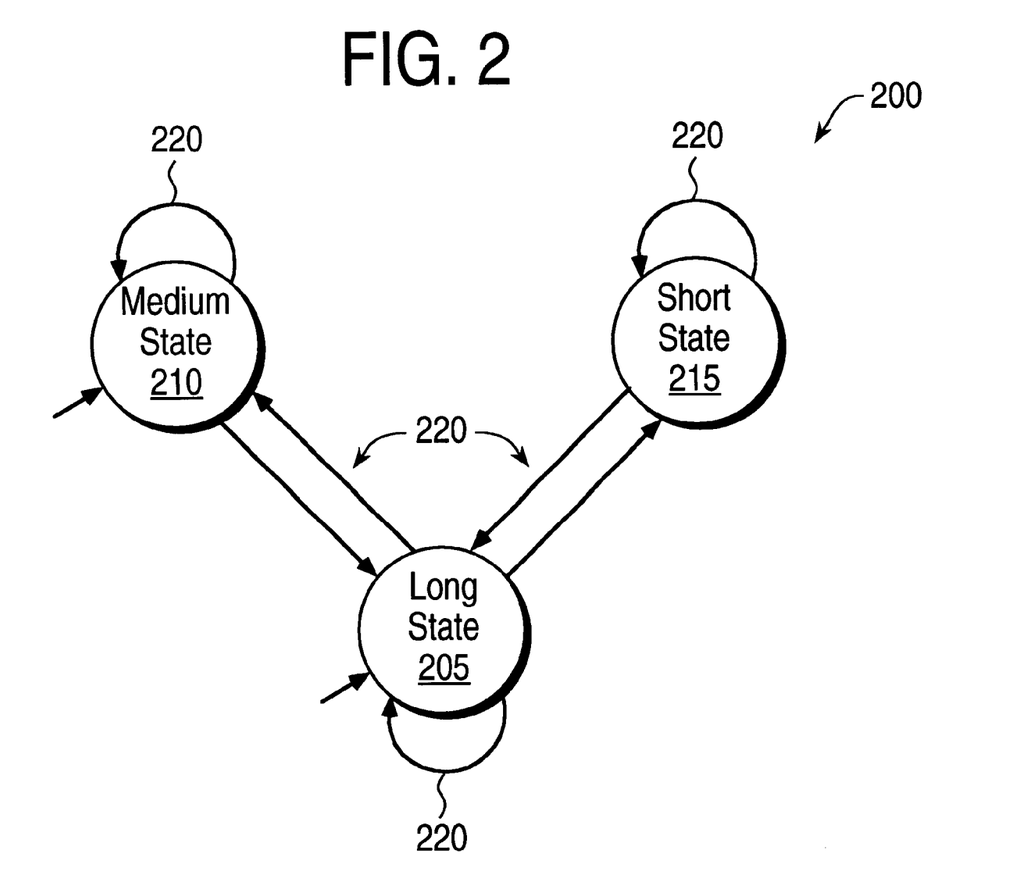
FIG. 2 is a state diagram illustrating the different possible transitions among the three different window types.

The bi-orthogonal modified discrete cosine transform module 115 is adaptive and provides three different analysis resolutions states to accommodate different audio signal 170 characteristics. The three different analysis resolution states include a long state 205, a medium state 210, and a short state 215, which in effect, vary the length of the window of samples used to calculate BMDCT frequency coefficients 183. In one embodiment, the long state 205 consists of five hundred and twelve (512) BMDCT frequency coefficients 183, the medium state 210 consists of two hundred and fifty-six (256) BMDCT frequency coefficients 183, and the short state 215 consists of one hundred and twenty-eight (128) BMDCT frequency coefficients 183. In another embodiment, the particular number of BMDCT frequency coefficients 183 for each state and the number of states can be varied. FIG. 2 is a state diagram 200 illustrating the different possible transitions among the three different analysis resolution states. Note that in FIG. 2, transitions 220 are allowed between the long state 205 and the medium state 210, the long state 205 and the short state 215, but not between the medium state 210 and short state 215 directly. This restriction reduces the number of different window types and hence reduces complexity, but is not necessary. Transitions 220 can also occur from the short state 215 to the short state 215, the medium state 210 to the medium state 210, and the long state 205 to the long state 205. Thus, in this embodiment, depending on the current state, there are either two or three transition 220 choices. Each state transition 220 corresponds to a BMDCT analysis transform.

The transitions shown in FIG. 2 represent windows applied to the signal. To move between two different states, a transition window is used. There are four possible transition windows (long-short, short-long, long-medium and medium-long) representing transitions between the long state 205 and the short state 215 and the long state 215 and the medium state 210. There are three non-transition windows (short, medium and long), one for each of the three states. So, in total, there are seven windows at the encoder 105 and decoder 110. The four transition windows are formed directly from the three non-transition windows (short, medium and long) in a way which guarantees reconstruction. The approach is similar to that for the conventional MDCT (See B. Edler, "Coding of Audio Signals with Overlapping Block Transform and Adaptive Window Functions", Frequenz, vol. 43, 1989). The design of the non-transition windows for the BMDCT and the inverse BMDCT is described below.

Figure 3:
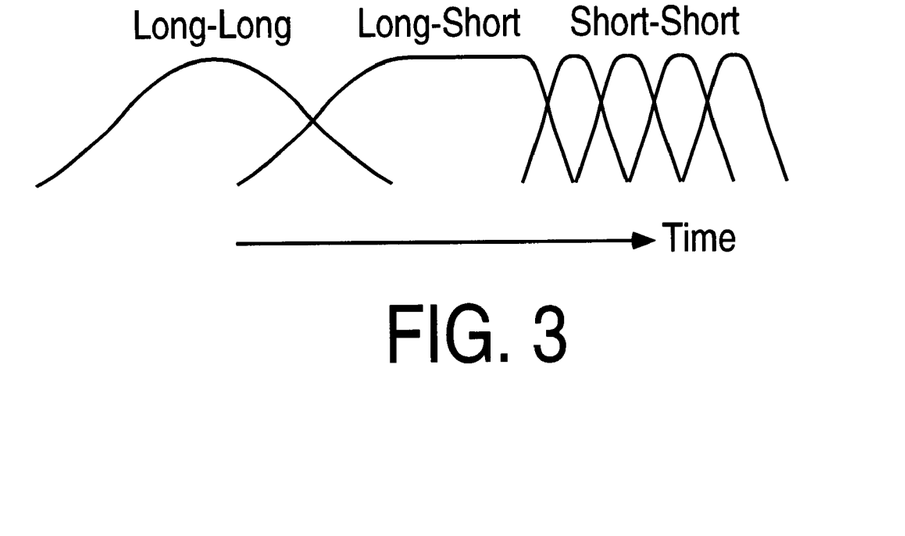
FIG. 3 illustrates an example of the transition from a long state to a short state.
Figure 4:
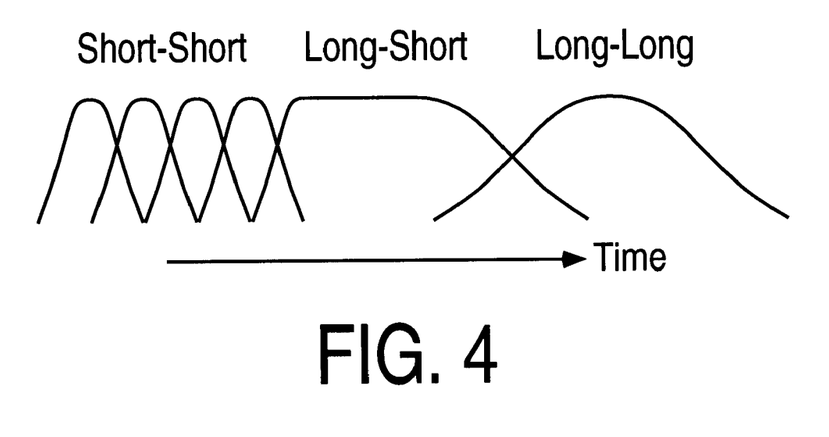
FIG. 4 illustrates an example of the transition from a short state to a long state.

An example of a transition 220 from a long state 205 to a short state 215 is shown in FIG. 3. To transition back from a short state 215 to a long state 205, the transition window is time reversed as shown in FIG. 4. The transitions 220 from a long state 205 to a medium state 210 and from a medium state 210 to a long state 205 are similar. Each of the four transition windows is used within a 512 point BMDCT. As a result, transitions 220 between different states can only occur on 512 sample boundaries. Since transitions 220 can only occur on 512 sample boundaries, one should apply the shorter transforms (short and medium) so that a minimum of 512 samples are produced. Short transforms produce 128 BMDCT coefficients, hence the perceptual audio signal compression system 100 can apply short transforms in groups of 4 to produce 512 samples. Medium transforms produce 256 BMDCT frequency coefficients 183, hence medium transforms can be applied in groups of 2 to produce 512 BMDCT frequency coefficients 183.

In the perceptual audio signal compression system 100, a group of 512 BMDCT coefficients, generated from the input signal, is called a sub-frame. For the purpose of formatting the final bitstream, the perceptual audio signal compression system 100 groups two sub-frames together to create a frame of 1024 BMDCT frequency coefficients 183 to be coded together. Other groupings are possible as well.

Figure 5:
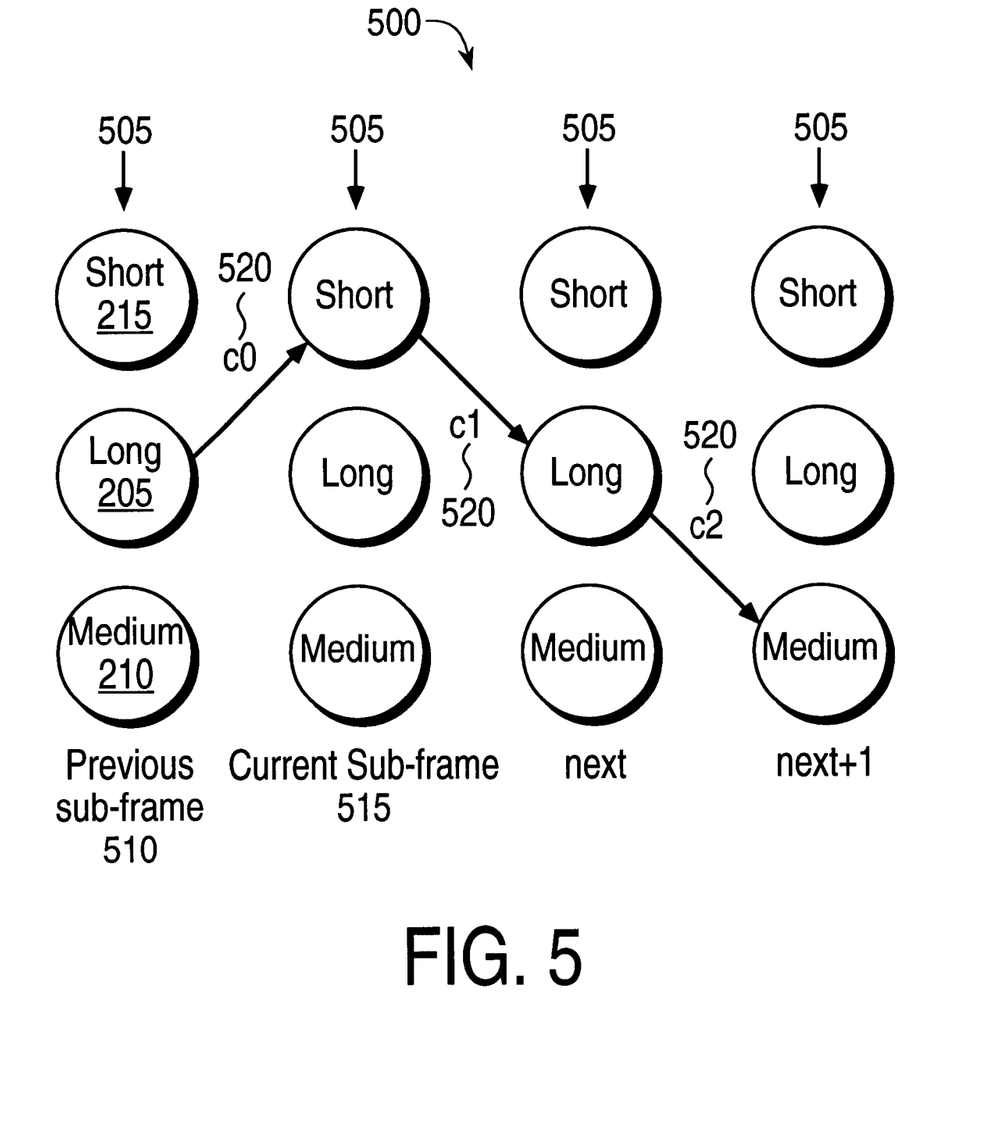
FIG. 5 illustrates one example of the signal analysis process for analyzing future sub-frames to determine the best window type for each BMDCT transform according to the invention.
Figure 6:
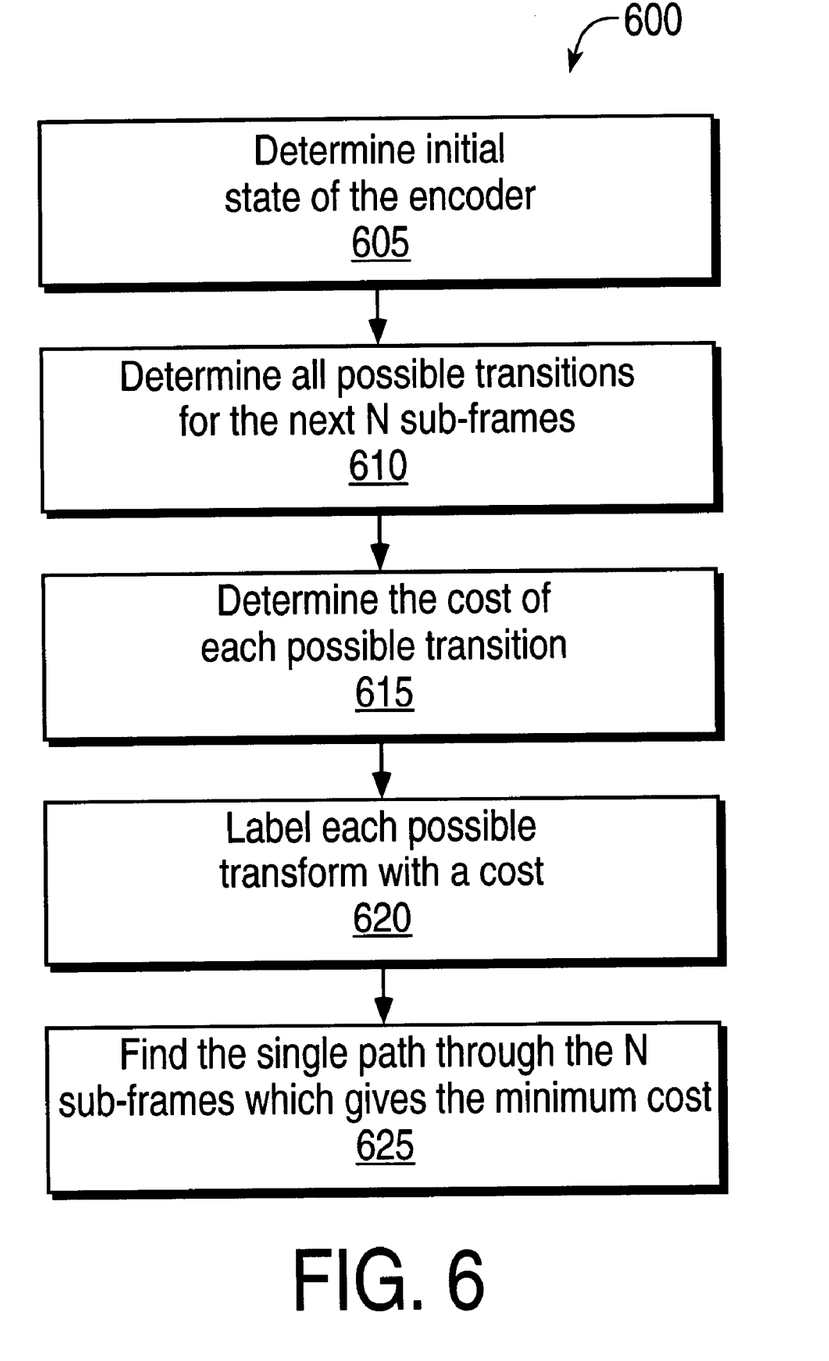
FIG. 6 is a flow diagram detailing a method for choosing a window type according to the invention.

The signal analysis module 130 analyzes the audio signal 170 and determines which window type to use for each BMDCT transform based on the audio signal's characteristics. Signal analysis involves looking at the characteristics of the audio signal 170 in the current sub-frames and future sub-frames. Analyzing current and future sub-frames of the audio signal 170 allows the encoder module 105 to determine which window type is optimum for each BMDCT transform. FIG. 5 illustrates one example of the signal analysis process for analyzing future sub-frames to determine the best window type for each BMDCT transform. The state graph 500 in FIG. 5 has multiple rows 505 of states represented by circles and transitions between states represented by lines. Each line in the diagram represents a possible analysis transform which can be applied. FIG. 6 provides a flow diagram detailing the method of determining the window type for a sub-frame based on the characteristics of the audio signal. Before encoding the current sub-frame, the encoder module 105 is in one of three possible states, depending on the window type used in the previous sub-frame 510. The states can be a short state 215, a medium state 210 or a long state 205. The signal analysis module 130 first analyzes the current sub-frame 515 (step 605) and the next N sub-frames (step 610), where N=2 in the current embodiment. The signal analysis module 130 chooses the best path through the state graph 500 by associating a cost 520 with each transition (steps 615–620). The cost 520 can be based on a number of different metrics. Examples of two cost metrics are the perceptual entropy (See J. D. Johnston, "Estimation of Perceptual Entropy Using Noise Masking Criteria", IEEE ICASSP, 1998), or the number of bits required to code the sub-frame coefficients transparently. Any other cost metric which provides a good representation of the difficulty in coding the frequency coefficients can be used in the scheme. The optimum path from the current state 515 is the path where the total transition costs 520 are at a minimum. The cost 520 of choosing a particular path is the sum of the individual transition costs (C0+C1+C2), as shown in FIG. 5. Using this method, a single path (i.e. a connected set of allowable transitions) through the state graph 500 which gives the minimum cost is found (step 625). The current sub-frame window type is given by the first transition in this optimum path. The window types for subsequent sub-frames are determined in the same way. Since the coding cost for each window type and each sub-frame 510 is independent, it is only necessary to calculate the cost 520 for each of the seven possible windows for each sub-frame 510 and then sum them to calculate the total cost 520 of a path. Costs 520 do not have to be recalculated for each sub-frame 510.

Once the signal analysis module 130 determines which window type to use for a particular sub-frame 510, that information is given to the BMDCT transform module 115. The BMDCT is a generalization of the MDCT. The MDCT is an orthogonal transform, while the BMDCT is a bi-orthogonal transform. Essentially this means the transform used at the encoder and decoder is different when the BMDCT is used, while if the MDCT is used, they are identical. The transform at the encoder uses the following basis functions:

$$e(k, n) = w_a \cos\left(\frac{\pi}{M}(k + 0.5)(n + \alpha)\right), k = 0 \ldots M - 1, n = 0 \ldots 2M - 1$$

Where M is the number of bands, and may be either 512, 256 or 128, $w_a$ is the analysis transform window, n is the time index, k is the frequency index and $\alpha=(M+1)/2$ (See J. Princen and A. Bradley, "Filter Bank Design Based on Time Domain Aliasing Cancellation", IEEE Transactions on Acoustics, Speech and Signal Processing", [October 1986.] October 1986 and J. Princen, A.

$$d(k, n) = w_s \cos\left(\frac{\pi}{M}(k + 0.5)(n + \alpha)\right), k = 0 \ldots M - 1, n = 0 \ldots 2M - 1$$

Johnson, and A. Bradley, "Subband/Transform Coding using Filterbank designs based on Time Domain Aliasing Cancellation", Proc. ICASSP 1987). This transform is equivalent to subband decomposition, i.e., dividing the signal into separated frequency bands. The frequency response of the filtering is determined by the window. In general the window, $w_a$, is chosen to provide good separation between bands. At the decoder the inverse transformation uses the following basis functions:

$$d(k, n) = w_s \cos\left(\frac{\pi}{M}(k + 0.5)(n + \alpha)\right), k = 0 \ldots M - 1, n = 0 \ldots 2M - 1$$

where $w_s$ is the synthesis transform window.

In the usual orthogonal MDCT, which is used in MP3 and AC3, the synthesis and analysis windows are equal. This single window is chosen so that if the analysis transform and the synthesis transform are applied back to back, the perceptual audio signal compression system 100 optimally reconstructs the original audio signal 170, in the absence of quantization. This property is important in conventional MDCT, since it guarantees that no distortion is introduced in the transformation process. The only distortion that results is due to signal quantization, which is introduced in a controlled way.

In this invention, the analysis and synthesis windows are different. The windows are selected so that the system perfectly reconstructs the input signal, while the synthesis window at the decoder is designed to use limited precision coefficients to save memory and computation. Since the analysis and synthesis windows are different, the transform utilized in this invention is a bi-orthogonal transform.

The process of constructing the analysis and synthesis windows is as follows. First the synthesis window is constructed. In the current embodiment, one starts with a sine shaped window to generate an integer window represented by a limited number of bits (nbits in the following equation):

$$w_s(n) = round\left((2^{nbits} - 1)\sin\left[\frac{\pi}{2M}(n + 0.5)\right]\right), n = 0 \ldots 2M - 1$$

where the round ( ) function finds the nearest integer. The equivalent window implemented in floating point is:

$$w'_s = \frac{w_s}{2^{nbits}}$$

Once the synthesis window is constructed, the analysis window (which allows optimal signal reconstruction) can be found by first defining a correction factor.

$$c(n) = w_s'^2(n) + w_s'^2(M+n), n=0 \ldots M-1$$

Next, the analysis window is defined as:

$$w_a(n) = w_s'(n)/c(n), n=0 \ldots M-1$$

$$w_a(2M-1-n) = w_a(n), n=0 \ldots M-1$$

By constructing these analysis and synthesis windows, the system achieves the two goals of reduced precision coefficients at the decoder while achieving perfect reconstruction.

There are a number of efficient methods which can be used to calculate the BMDCT transform since it has the same structure as an MDCT transform, sometimes referred to as the Modulated Lapped Transform (See H. Malavar, "Signal Processing with Lapped Transforms", Artech House, 1992). One typical approach is to first window the input signal using the analysis window. This windowing step can be represented as follows:

$$x_m^w(n) = w_a(n)x(n+mM), n=0 \ldots 2M-1$$

where the input signal x(n) is the audio signal, $w_a(n)$ is the analysis window, and the output of the above equation is the windowed signal. Next, transform the windowed signal to generate the frequency coefficients using the equation as follows:

$$X_m(k) = \sum_{n=0}^{2M-1} x_m^w(n) \cdot \cos\left(\frac{\pi}{M}(k + 0.5)(n + \alpha)\right), k = 0 \ldots M - 1$$

where the constant $\alpha=(M+1)/2$.

After the audio signal 170 has been BMDCT transformed, the BMDCT frequency coefficients 183 are received at the stereo transform module 135. The BMDCT frequency coefficients 183 may contain many bits that are either redundant or irrelevant. Redundancy occurs when there is significant correlation between the channels in a stereo pair. Redundancy results in the stereo signal having a dominant direction and hence significant improvements in coding performance can be obtained by transforming the stereo signal so that coding is aligned with the dominant direction. Irrelevancy, in the case of processing stereo audio signals, refers to the fact that at high frequencies, (i.e. greater than 6 KHz) the human ear determines stereo position by the intensity difference between the signals at the two ears. This implies that phase is irrelevant and therefore can be removed. As long as the intensity of the left and right signals is preserved, the perception of the stereo image will be maintained.

The perceptual audio signal compression system 100 uses a unified stereo transformation system to exploit both stereo redundancy and stereo irrelevancy. This includes a transform at the encoder 105 and an inverse transform at decoder 110. At the encoder 105, there are two different ways to calculate the stereo transform, where the syntax used is general and simple. The decoder 110 behaves the same no matter what stereo transform calculation method is used at the encoder 105.

The BMDCT frequency coefficients 183 (as noted before) comprise a stereo pair. The decoder 110 implements an inverse stereo transform which is given by the following orthogonal transformation $$\begin{bmatrix} L \\ R \end{bmatrix} = \begin{bmatrix} \cos(\theta) & -\sin(\theta) \\ \sin(\theta) & \cos(\theta) \end{bmatrix} \cdot \begin{bmatrix} L' \\ R' \end{bmatrix}$$

where, θ is the transform angle, L' and R' are the received Left and Right coefficients and L and R are the inverse transformed coefficients. The transform angles can vary across frequency and time and are sent as part of the bitstream. The encoder can calculate the transform angles and the L', R' signals differently depending on whether it is exploiting redundancy or irrelevancy in the signal.

Stereo irrelevancy is exploited at high frequencies, i.e. greater than some frequency $f_i$, by determining a transform angle 173 in each band based on the relative energy in the two channel signals. Next, the left and right channel signals are summed (or their difference is taken) to form a monophonic signal, which is subsequently coded and transmitted as the first channel, while the second channel of the pair has its signal component set to zero above $f_i$. One possible way to calculate the transform angle 173 in each band is:

$$\theta = \tan^{-1}(E_r/E_l)$$

where, $E_r$ is the right channel (i.e. second channel) energy, and $E_l$ is the left channel (first channel) energy. This transform angle is subsequently quantized to some fixed number of angles between 0 and π/2. For illustrative purposes, one method that quantizes to one of 17 possible values uses the following equation:

$$i = round(32\theta/\pi)$$

However, it will be obvious to those skilled in the art that any number of other values can be used. The integer values are then losslessly encoded, as described later, and transmitted as the transform angle information 173 in the formatted bitstream 157.

The unified stereo technique can also be used to exploit signal redundancy. In this case, one way to find the transform angle 173 is to first calculate the two by two cross-correlation matrix for the band of coefficients in the left and right channel for which the optimum transform is to be calculated, using standard techniques. Then the optimum transform matrix is formed by the eigenvectors of the cross-correlation matrix. The eigenvectors can be calculated by any standard procedure (See G. Strang, "Linear Algebra and its Applications", $3^{rd}$ edition, Harcourt Brace, 1988). From the eigenvectors the optimum transform angle can be calculated as follows:

θ=tan$^{-1}$(eigenvector[0][0]/eigenvector[0][1])

assuming the eigenvectors have been normalized. The angle is then quantized to produce the final tranform angle information 173. Once the transform angle 173 is found, the left and right signals can be transformed using the following transform:

$$\begin{bmatrix} L' \\ R' \end{bmatrix} = \begin{bmatrix} \cos(\theta) & \sin(\theta) \\ -\sin(\theta) & \cos(\theta) \end{bmatrix} \cdot \begin{bmatrix} L \\ R \end{bmatrix}$$

to form the channel signals, which are subsequently quantized and losslessly encoded.

It should be noted, that a transform angle 173 with the value zero implies that the transformation leaves the left and right signals unchanged. Also, the encoder 105 can apply a number of methods to calculate the transform angle 173 and channel signals to various spectrum areas. One typical method calculates the transform angle 173 and transformed signals using. redundancy at low frequencies, and then calculates the transform angle 173 and transformed signals using irrelevancy at high frequencies. Regardless of the method applied, at any given point in the spectrum, the end result of stereo processing is a transformed channel pair and an array of angles.

After the BMDCT frequency coefficients 183 have been stereo transformed, the BMDCT frequency coefficients 185 represent the audio signal 170 in different frequency bands from low frequency to high frequency. By controlling the quantization noise introduced in the different frequency bands, it is possible to further compress the audio signal 170 while maintaining good audio signal quality after decoding, or alternatively, at a given allowable bit rate, minimize the audibility of the audio signal noise. To minimize the audio signal's noise audibility, one can analyze the audio signal 170 and determine an appropriate quantization noise shape and level. The signal analysis module 130 analyzes the audio signal 170 and creates a set of noise targets. 175 where noise can be transparently introduced into the audio signal 170, to compress the audio signal 170 as detailed below. Each step is calculated separately for the long 205, medium 210, and short 215 window types.

One can apply the same signal analysis as that described in the ISO/IEC MPEG-1 Audio Coding standard (See ISO/IEC 11172–3:1993 Information technology—Coding of Moving Pictures and Associated Audio for Digital Storage Media at up to about 1.5 Mbit/s—Part 3: Audio), as Psycho-acoustic model 2. The inputs to the perceptual model are the energy and phase of spectral lines calculated from an FFT of the same length as the BMDCT applied to the signal. The output from the perceptual model is a set of transparent noise targets 175, which represent the largest noise levels, as a function of frequency, which can be introduced to the audio signal 170 without becoming audible. These noise levels can be used directly to calculate Perceptual Entropy used as an input to the window type decision as described above and can also be used as the starting point for rate control.

The differences between the signal analysis used in the perceptual audio signal compression system 100 and MPEG Psycho-acoustic Model 2, are the tonality calculation and a final step in which the target noise curve is calculated. The tonality is calculated according to the following equation:

$$t = 1.0 - \left[ \frac{-\sum e(i) \log_{10}(e(i))}{\sum e(i)} + \frac{\log_{10}(\sum e(i))}{\log_{10}(w)} \right]$$

where w is the width of the band and e(i) are the audio signal's spectral line energies. The sums are calculated over all the spectral lines which fall inside the frequency band. Once the set of noise targets 175 are determined, a target noise curve can be calculated for rate controlled applications as follows:

$$tNoise[b] = K \left( \frac{noise[b]}{energy[b]} \right)^{rcWeight} energy[b],$$

where K is a constant, noise[b] are the transparent noise targets for band b, energy[b] are the audio signal energies in band b and rcWeight is a constant which determines the shape of the target noise curve.

The resulting target noise curve provides a flexible mechanism for adjusting the noise shape in undercoding situations, and is particularly useful for very low rate coding. Note that for rcWeight=1.0, the target noise is just a scaled version of the transparent noise and the noise shape will be maintained as the target rate is reduced. This can cause problems since high signal to noise ratio (SNR) regions will have their SNR reduced much less significantly than low SNR regions. Alternatively for rcWeight=0.0, the target noise curve is equal to the signal energy. For overcoding situations, where the noise introduced is greater than the calculated transparent noise, the rate control module 140 will interpolate between the transparent noise target and the signal energy. In general, a value of rcWeight between one-half (0.5) and three-fourths (0.75) has been found to give good performance. This target noise curve together with the transparent noise targets are then delivered to the rate control module 140.

The noise target 175 information generated by the signal analysis module 130 is received at the rate control module 140. The rate control module 140 adjusts step sizes 190 which are sent to the quantization module 120. By adjusting these step sizes 190, the bits required for a particular frame can be increased or decreased. This flexible allocation of bits is beneficial since the frames vary in their complexity. The steps which the rate control module 140 implements to determine a final noise target are as follows. First, a target number of bits is determined for the frame. The allocation of a number of bits to the current frame is based on the average complexity of the audio signal 170 and the current frame's complexity. Complexity is measured as the number of bits required to encode the frame transparently. The equation for allocating a number of bits of a frame is as follows:

tBits=avBits(0.75+0.25frameComplexity/avComplexity), where avBits is the constant bit rate target. Note that the frame complexity is determined by passing the step sizes 190 to the quantization module 120, generating the quantized BMDCT frequency coefficients 195, then passing these quantized BMDCT frequency coefficients 195 to the lossless encoding module 125, which encodes them and counts the number of bits which are generated. The average complexity (avComplexity) is a measure of the complexity of the complete stream up to the current frame and is updated as follows after coding each frame:

avComplexity(n)=(1-weight)frameComplexity(n)+weight.avComplexity(n-1)

where n is the frame number and weight is a number that determines how quickly the average complexity changes with changes in local frame complexity. A typical value for weight is 0.95.

Given the target number of bits for a particular frame, the rate control module 140 then searches for a final noise target from the noise target information 175 provided by the signal analysis module 130 which can meet the target number of bits. The noise targets are adjusted using a single control variable, alpha. The control variable alpha lies between zero (0) and two (2). A value of alpha=1.0 will give a final noise target which is equal to the transparent noise target from the signal analysis. Values of alpha less than one (1) reduce the noise target. Values of alpha greater than one (1) increase the noise target. For values of alpha over one (1), the final noise target is calculated by taking a linear interpolation between the transparent noise target and the target noise curve calculated by the signal analysis module 130.

The search for a value of alpha which meets the bit rate constraints is done in two (2) stages. First, a coarse search is done to get two (2) values of alpha, one which gives a bit rate higher than required, and one which gives a bit rate lower than required. Next, a bisection search is done to refine these values of alpha until they are within five percent (5%) of the required bit rate. Note, to determine the number of bits required to code at a given noise target, the rate control module 140 calls the quantization module 120 to quantize the BMDCT frequency coefficients 195 and the lossless encoding module 125 to encode the BMDCT frequency coefficients 195 and count the number of bits.

Once the noise target is determined, the rate control module 140 must then determine the step size 190 required to introduce noise into the stereo transformed BMDCT frequency coefficients 185 so that the required bit rate per frame is met. The step size 190 for a particular frequency band is chosen so that the noise introduced in the frequency band meets a target bit rate per frame. The search is initialized by finding the step size 190 which would produce the given noise target if the input audio signal 170 was a uniformly distributed random variable. Note that the rate control module 140 can allow the step size 190 to be controlled in two (2) dB increments, which can be varied in different implementations. The first step in determining the appropriate step size 190, is to set the initial step size 190 to the closest value to $\sqrt{12nT/\text{width}}$, where width is the number of coefficients in the frequency band and nT is the noise target, which can be represented by the quantized step sizes (e.g., within one (1) dB). Next, using this step size 190, calculate the actual noise which is introduced in the band by quantizing the BMDCT frequency coefficients 185 and taking the sum squared difference between the quantized BMDCT frequency coefficients 195 and the original audio signal 170. If the noise introduced is greater than the target noise, reduce the step size 190 in two (2) dB increments until the noise is less than the noise target. If the noise is less than the noise target, increase the step size 190 in 2 dB increments until the noise is greater than the noise target, then use this step size 190 minus 2.0 dB. The rate control module 140 then feeds the step size 190 information to the quantization module 120.

The quantization module 120 receives the stereo transformed BMDCT frequency coefficients 185 from the stereo transform module 135 and the step size 190 information from the rate control module 140. The quantization module 120 then quantizes the BMDCT frequency coefficients 185 using uniform quantization to produce multiple sets of integer numbers. The integer numbers represent the corresponding BMDCT frequency coefficients 185. The quantization technique that the quantization module 120 uses is relatively straight-forward since uniform quantization is used for all of the BMDCT frequency coefficients 185. For a given step size 190, the quantized BMDCT frequency coefficient 195 is represented as an integer as follows:

$$C_q = \text{Round}(C/\text{step\_size})$$

The step_size value received from the rate control module 140 varies across the frequency spectrum, but is fixed within frequency bands. The frequency band arrangement depends on the sampling frequency and the modified discrete cosine transform size used for the sub-frame.

The organization of the sets of integer numbers produced by the quantization module 120 depends on the window type that has been chosen. For each sub-frame there are three (3) possible window types, and hence three possibilities in the organization of the BMDCT coefficients, as shown in FIG. 7.

Figure 7:
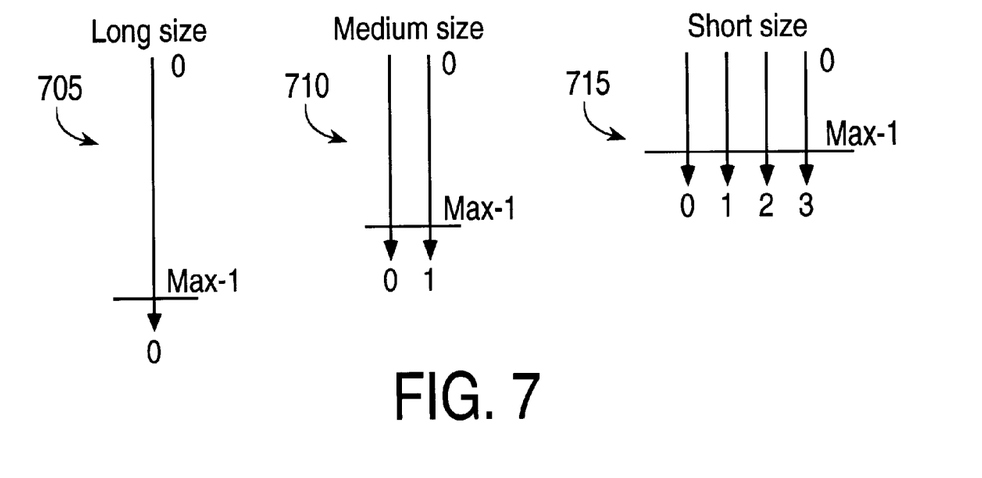
FIG. 7 is a diagram illustrating the block structure of the long, medium, and short window types.

FIG. 7 is the diagram of a long size window 705, a medium size window 710, and a short size window 715. In FIG. 7, Max can be up to 512 BMDCT coefficients for the long sized windows, 256 for the medium sized window and 128 for the short sized window. As noted before, there are two sub-frames per frame. The integer numbers that represent the quantitized BMDCT frequency coefficients 195 in the two (2) sub-frames of a frame are next losslessly encoded in the lossless encoder module 125, yielding audio signal coefficient symbols 153.

In one embodiment of the perceptual audio signal compression system 100, a pair of sub-frames are grouped into a frame. Quantized BMDCT frequency coefficients 195 from the sub-frame pair are losslessly encoded together to achieve higher efficiency. Before losslessly encoding the integer numbers generated from the quantization step, a pair of sub-frames are scanned into either a single array or a pair of arrays. There are a number of possible ways to generate these arrays. First, the pair of sub-frames can be grouped, that is they can be scanned to form a single array for coding purposes. This is advantageous, especially in the case of relatively stationary audio content, since it reduces the encoding overhead. Alternatively the pair of sub-frames can be coded as separate arrays. This is advantageous if the audio signal 170 is non-stationary.

Figure 8:
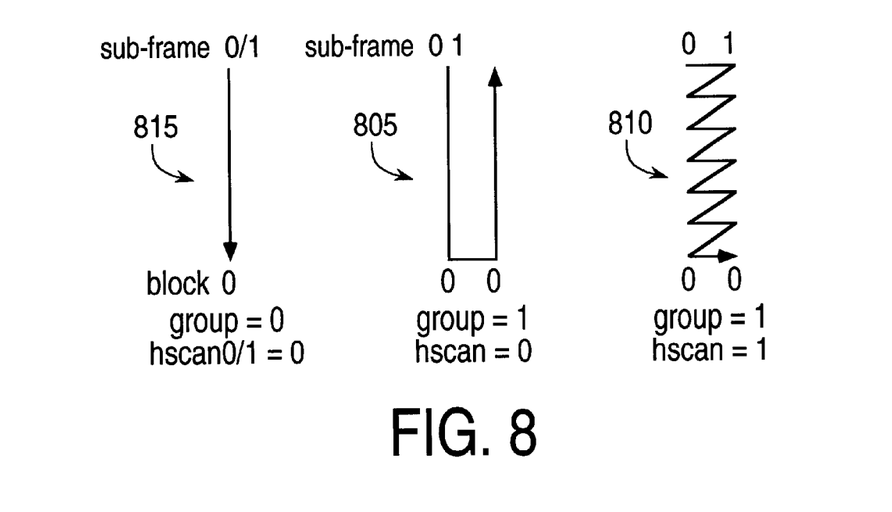
FIG. 8 is a diagram illustrating different scanning possibilities for the coefficient symbols for long BMDCT sub-frames according to the invention.

Once the grouping has been determined, the collection of quantized BMDCT frequency coefficients 195 are scanned in either the "horizontal" or "vertical" direction. Horizontal implies scanning the quantized BMDCT frequency coefficients 195 at the lowest quantized BMDCT frequency coefficient 195 and taking all low quantized BMDCT frequency coefficients 195 from every analysis block in the collection. Next, move to the next lowest quantized BMDCT frequency coefficient 195 and so on. Vertical scanning implies scanning from the lowest quantized BMDCT frequency coefficient 195 in the first block and taking all quantized BMDCT frequency coefficients 195 up to the highest BMDCT frequency coefficient in that block. Next, starting at the highest BMDCT frequency coefficient of the next block and scanning down to the lowest frequency, and so on. For sub-frames coded with a long length BMDCT window type, there is one block in each sub-frame. Possible scanning patterns 805, 810 and 815 for long length, BMDCT window types for the grouped and ungrouped case are shown in FIG. 8. For the ungrouped case, horizontal scanning cannot be used.

Figure 9:
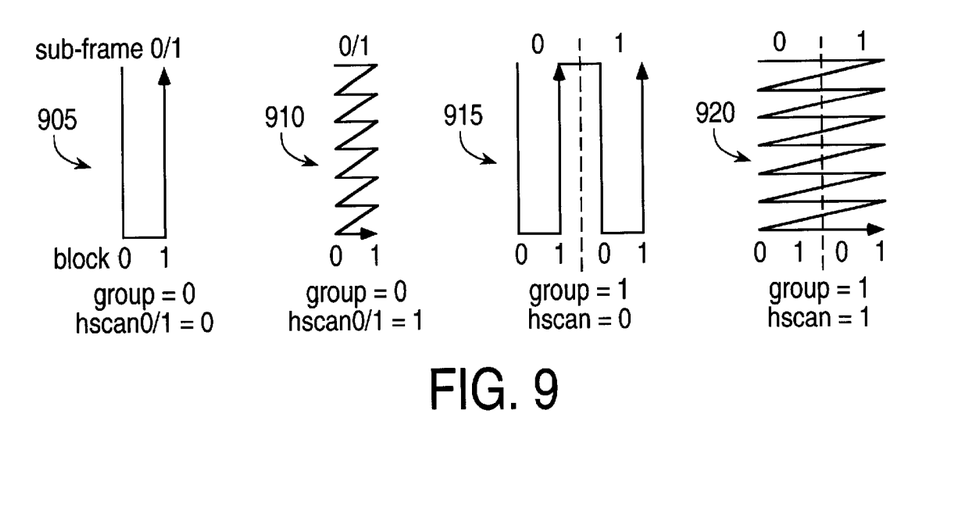
FIG. 9 is a diagram illustrating different scanning possibilities for the coefficient symbols for medium BMDCT sub-frames according to the invention.
Figure 10:
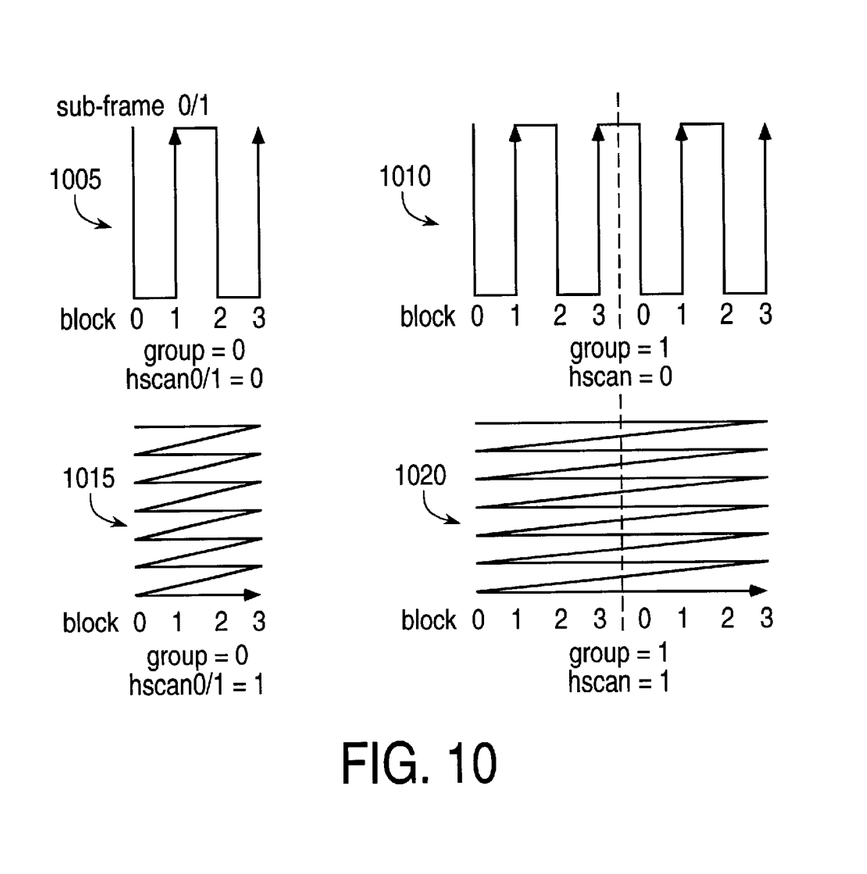
FIG. 10 is a diagram illustrating different scanning possibilities for the coefficient symbols for long BMDCT sub-frames according to the invention.

For sub-frames coded with a medium length BMDCT window type, there are two (2) blocks in each sub-frame. Possible scanning patterns 905, 910, 915, and 920 for medium length BMDCT window types for the grouped and ungrouped case are shown in FIG. 9. Both grouped and ungrouped coefficient symbols 153 from a medium length BMDCT window type can be scanned vertically and horizontally. If sub-frames are coded with a short length BMDCT window type, there are 4 blocks in the sub-frame. Possible scanning patterns 1005, 1010, 1015, and 1020 for sub-frames coded with a short length BMDCT are shown in FIG. 10 for both grouped and ungrouped cases. The short length coefficients symbols 153 can also be scanned in vertically and horizontally for grouped and ungrouped cases.

Once coefficient grouping has occurred, the lossless encoding has a single array of integer numbers to encode. Lossless encoding uses a collection of Huffman and PCM coding techniques in a very flexible way to encode the array of integers efficiently. To illustrate the approach, Table 1 describes one possible collection of Huffman and PCM coders.

TABLE 1

| Code index | codebook definition | Number of Symbols | Coefficient range | Coefficients per symbol | EOB code (nbits) |
|---|---|---|---|---|---|
| 0 | huffman 1 | 82 | +/−1 | 4 | 0x1d (5) |
| 1 | huffman 2 | 26 | +/−2 | 2 | 0x30 (6) |
| 2 | huffman 3 | 50 | +/−3 | 2 | 0x23 (6) |
| 3 | huffman 4 | 82 | +/−4 | 2 | 0x6 (4) |
| 4 | huffman 5 | 122 | +/−5 | 2 | 0x1f (5) |
| 5 | huffman 6 | 170 | +/−6 | 2 | 0x0 (4) |
| 6 | huffman 7 | 226 | +/−7 | 2 | 0x17 (5) |
| 7 | huffman 8 | 257 | 0 to +15 | 2 | 0xf (5) |
| 8 | PCM | 64 | +/−31 | 1 | −32 (6) |
| 9 | PCM | 128 | +/−63 | 1 | −64 (7) |
| 10 | PCM | 256 | +/−127 | 1 | −128 (8) |
| 11 | PCM | 512 | +/−255 | 1 | −256 (9) |
| 12 | PCM | 1024 | +/−511 | 1 | −512 (10) |
| 13 | PCM | 2048 | +/−1023 | 1 | −1024 (11) |
| 14 | PCM | 4096 | +/−2047 | 1 | −2048 (12) |
| 15 | PCM | 8192 | +/−4095 | 1 | −4096 (13) |
| 16 | PCM | 16384 | +/−8191 | 1 | −8192 (14) |
| 17 | PCM | 32768 | +/−16383 | 1 | −16384 (15) |
| 18 | PCM | 65536 | +/−32767 | 1 | −32768 (16) |
| 19 | PCM | 131072 | +/−65535 | 1 | −65536 (17) |
| 20 | PCM | 262144 | +/−131071 | 1 | −131072 (18) |
| 21 | PCM | 524288 | +/−262143 | 1 | −262144 (19) |
| 22 | PCM | 1048576 | +/−524287 | 1 | −524288 (20) |

Table 1 shows 8 Huffman encoders and 15 PCM encoders. Each encoder has a maximum coefficient range which it can encode, as shown in column 4. Huffman encoder 8 is special in that it only encodes positive numbers and an additional sign bit is used to complete the transmitted code so that together they encode numbers in the range ±15. The Huffman encoders also encode multiple coefficients with one symbol to improve efficiency, while the PCM encoders only encode one coefficient per symbol. Also note that each encoder has an end of block symbol. For the Huffman encoders, the end of block is one symbol in their code-book, while for the PCM coders, the end of block symbol is chosen to be the most negative value that can be represented. For example, in a sixteen (16) bit pulse code modulation coder, the value −32768 can be the end of block symbol and the coder can represent numbers between ±32767. The end of block symbol is required to implement the flexible lossless encoding system described below. The symbols used in the Huffman encoders are not important for the discussion. Any Huffman code-book which can encode the coefficient range shown and provides a unique end of block symbol, can be used. The particular coefficient ranges are illustrative only and others are possible.

Figure 11:
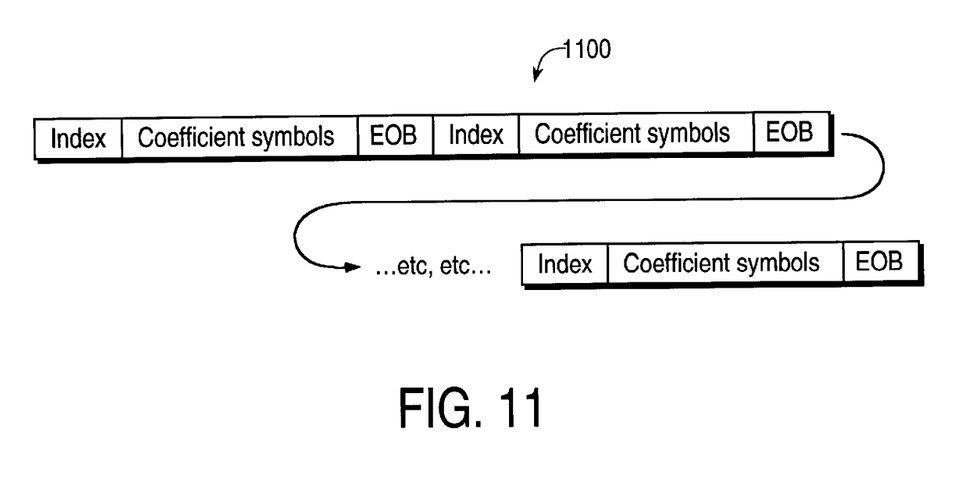
FIG. 11 is a diagram illustrating the final representation of an array of coefficient symbols according to the invention.

FIG. 11 is a diagram 1100 illustrating the final representation of the array. The final array representation consists of: code index, collection of coefficient symbols, end of block code, code index, coefficients, end of block code, etc, sequentially until there are no more coefficients in the array. This bitstream representation allows a large number of possible ways to represent a single array of coefficients. There are several ways in which an optimal representation, i.e., one that uses the least number of bits, can be obtained. The perceptual audio signal compression system 100 runs through the array and sequentially assigns the "smallest" code method that codes some minimum number of symbols. This usually gives a large number of small sections, which is not necessarily optimal because the overhead (code index and End of Block symbol (EOB)) associated with switching code methods. Next, the procedure sequentially runs through the code assignments and merges adjacent sections if the merged section takes less bits than the two sections separately.

After the integer numbers have been losslessly encoded, the audio signal coefficient symbols 153 are received at the frame packing module 145. The frame packing module is responsible for organizing the coded coefficient information and various pieces of side information, such as the step sizes, transform angles, window types, etc. into a single bitstream. The formatted bitstream 157 can be either stored in memory or can be transmitted over a digital channel 163.

To decode the formatted bitstream 157, the formatted bitstream 157 first enters the frame unpacking module 147. The frame unpacking module 147 separates various pieces of side information 167 from the coded quantized BMDCT frequency coefficients. The side information 167 is passed along to the relevant modules as shown in FIG. 1, and the coded quantized BMDCT frequency coefficients are passed along to the lossless decoder module 150. The lossless decoding module is a collection of Huffman and PCM decoders, exactly the inverse of the encoders used in the encoder. The lossless decoding module takes the representation of the array as shown in FIG. 11 and reconstructs the array of coefficients. This is a straight-forward process which involves sequentially moving through the bitstream representation shown in FIG. 11, identifying the coding method index, using the associated decoder to decode symbols into integer coefficients until an end of block symbol is reached, then decoding the next coding method index, etc, until all coefficients have been decoded to form the array of integers. After this, the grouping and scanning which was applied at the encoder is inverted so that the lossless decoder module 150 produces a final set of integer coefficients organized in blocks and sub-frames and ordered from low to high frequency.

After losslessly decoding the formatted bitstream 157, the next step in the synthesis process is inverse quantization. The inverse quantization module 155 takes the losslessly decoded coefficients and the step sizes 190 and reconstructs the stereo transformed BMDCT frequency coefficients 187. Since the encoder 105 uses uniform quantization for the quantization processes, the inverse quantization module 155 simply needs to multiply the stereo transformed BMDCT frequency coefficients 187 by appropriate step sizes 190. As stated above, the step size 190 information is a set of values representing the step size across regions of the frequency spectrum. The frequency band structure (i.e., the division of the spectrum into regions) is fixed for a given BMDCT resolution and sample rate. In pseudo C code the inverse quantization for a single block can be implemented as follows:

```
for (sindex=0; sindex<max_ss; sindex++) {
    for (index=step_band [sindex].start; index<=step_band[sindex].end; index++) {
        coefficient[index]=qcoefficient[index]*step[sindex];
    }
}
```

The variable step_band[ ] defines the structure of the frequency bands. The variable step[ ] represents the losslessly decoded step sizes. The variable qcoefficient[ ] represents the losslessly decoded coefficients symbols 195 and the variable coefficients[ ] represents the inverse quantized BMDCT frequency coefficient values 187.

Next, the inverse stereo transform module 160 takes the inverse quantized BMDCT frequency coefficients 187 from a pair of channels and the transform angle information 173 and produces the BMDCT frequency coefficients 188 for the left and right channels of the signal. The inverse stereo transform module 160 uses a general stereo transform which allows seventeen (17) different stereo transformations, representing seventeen (17) different spatial orientations. The transform angle 173 information itself is encoded differentially and uses a Huffman code so that the most common cases have the shortest symbols. The inverse stereo transform is a simple 2×2 rotation, based on the transform angle 173. The inverse stereo transform exploits both stereo redundancy and irrelevancy. The inverse stereo transformation applied to each coefficient is shown below:

$$\begin{bmatrix} L \\ R \end{bmatrix} = \begin{bmatrix} \cos(\theta) & -\sin(\theta) \\ \sin(\theta) & \cos(\theta) \end{bmatrix} \cdot \begin{bmatrix} L' \\ R' \end{bmatrix}$$

where L' and R' are the inverse quantized coefficients and L and R are the transformed coefficients. The transform angle 173 is decoded from the stereo transform side information 167 as described above. As stated before, if there is no transformation then the transform angle 173 is assumed to be 0 and the transform is a 2×2 identity matrix. The stereo transforms are defined using the same frequency band structure as the step sizes 190. The stereo transformation for the complete set of BMDCT frequency coefficients 187 for a single block in pseudo C is shown below:

```
for (tindex=0; tindex<num_transforms; tindex++) {
    for (index=step_band[tindex].start; index<=step_band[tindex].end; index++) {
        tL[index]=cos(angle[tindex])*coefficientL[index]-
        sin(angle)*coefficientR[tindex]);
        tR[index]=sin(angle[tindex])*coefficientL[index]
        +cos(angle)*coefficientR[tindex]);
    }
}
```

The final step in decompression is to take the inverse quantized, possibly inverse stereo transformed, BMDCT coefficients and apply the inverse BMDCT transform to create the time domain output. The inverse BMDCT transform consists of two steps: inverse transform and overlap add. The inverse transformation used in perceptual audio signal compression system 100 is defined as follows:

$$y(i) = \frac{2}{\sqrt{M}} \sum_{k=0}^{M-1} X(k) \cos\left(\frac{\pi}{M}(k+0.5)\left(i + \frac{M+1}{2}\right)\right), i = 0 \ldots 2M-1$$

where M is the number of frequency bands, and is either five hundred twelve (512), two hundred fifty-six (256) or one hundred twenty-eight 128. Following inverse transformation, the outputs are windowed and overlap added to the previous M samples in the synthesis buffer as follows:

ola_buffer($i$)=ola_buffer($i+M$)+$w_s(i)$ $y(i)$,$i$=0 ... $M-1$ ola_buffer($i+M$)=$w_s(i+M)y(i+M)$,$i$=0 ... $M-1$ the synthesis window $w_s(i)$ is the synthesis window as described earlier. The output samples are the first M samples in the overlap add buffer ola_buffer[ ].

Although the invention has been described in detail, it should be understood that various changes, substitutions and alterations can be made hereto without departing from the spirit and scope of the invention as described in the appended claims. For example, the precision of the multipliers used at the encoder or decoder can be higher or lower precision multipliers. The signal analysis module can look beyond three future frames to better determine the best window type to use for each BMDCT transform.

What is claimed is:

1. A method for encoding a signal, comprising the steps of:
    transforming the signal into a plurality of BMDCT frequency coefficients using a bi-orthogonal modified discrete cosine transform, wherein three different BMDCT transform sizes are being used;
    quantizing the BMDCT frequency coefficients to produce a set of integer numbers which represent the BMDCT frequency coefficients; and
    losslessly encoding the set of integer numbers into representative symbols to lower the number of bits required to represent the BMDCT frequency coefficients.

2. The method of claim 1, wherein the three different BMDCT transform sizes are 512, 256 and 128.

3. The method of claim 1, wherein signal analysis is performed on current and future audio frames to determine the optimal window size to use for the current frame.

4. An encoding method of claim 1, wherein the BMDCT window coefficients at the decoder are represented at a reduced number of bits of precision.

5. The method of claim 4, wherein the decoder BMDCT window coefficients are given by $$w_s = \frac{w_s}{2^{nbits}}$$

where $$w_s(n) = round\left((2^{nbits}-1)\sin\left[\frac{\pi}{2M}(n+0.5)\right]\right), n = 0 \ldots 2M-1,$$

where M is the transform size and nbits is the number of bits of precision.

6. An encoding method of claim 1, wherein the BMDCT window coefficients at the encoder are designed such that the combination of forward transform and inverse transform perfectly reconstruct the signal.

7. The method of claim 6, wherein the encoder BMDCT window is defined as $$w_a(n)=w_s'(n)/c(n), n=0 \ldots M-1$$

$$w_a(2M-1-n)=w_a(n), n=0 \ldots M-1$$

where $$c(n)=w_s'^2(n)+w_s'^2(M+n), n=0 \ldots M-1.$$

8. The method of claim 1, wherein the BMDCT coefficients are quantized using uniform quantization such that each quantized coefficient is represented as $$C_q = \text{Round}(C/\text{step\_size}), \text{ for a given step size.}$$

9. The method of claim 8, wherein the quantization step sizes vary with frequency and with time.

10. The method of claim 8, wherein the quantization step further includes frequency variation of the step sizes by dividing the frequency spectrum into a set of bands over which the quantization step size is constant and grouping one or more sets of BMDCT transform coefficients together into a frame that uses the same step sizes as a function of frequency.

11. The method of claim 8, wherein quantization step sizes are calculated by determining a set of transparent noise levels using a psycho-acoustic model, representing noise that can be introduced into the signal and just remain inaudible, and calculating quantization step sizes such that the introduced quantization noise is at or below the transparent noise levels.

12. The method of claim 11, wherein the psycho-acoustic model uses tonality measure that is calculated as $$t = 1.0 - \left[ \frac{-\sum e(i) \log 10(e(i))}{\sum e(i)} + \frac{\log 10\left(\sum e(i)\right)}{\log 10(w)} \right]$$

where w is the width of a band of coefficients used to calculate tonality and e(i) are the spectral line energies, and wherein the sums are calculated over all the BMDCT coefficients that fall inside the band.

13. The method of claim 11, wherein the quantization step sizes are calculated from the desired noise levels, wherein the calculation comprises the steps of:
setting the initial step size to the closest value to $\sqrt{12nT/\text{width}}$, wherein nT is the noise target and width is the width of the frequency band over which the desired noise level has been calculated;
using this step size to calculate the actual noise which is introduced in the band by quantizing the signal and taking the sum squared difference between the quantized signal and the original signal;
reducing the step size in small decrements until the actual noise is less than the target if the noise introduced is greater than the target noise; and
increasing the step size in small increments until the noise is just below or equal to the target if the noise is less than the target.

14. The method of claim 11, wherein the quantization step sizes for a frame are adjusted by adjusting the target noise level for the frame, whereby the total number of bits required to code the frame is equal to or just less than a given target.

15. The method of claim 14, wherein the target number of bits for a frame is determined from the complexity of the current frame in relation to the average complexity of previous frames.

16. The method of claim 15, wherein the target number of bits for a frame, n, is given by $$tBits(n) = avBits \cdot \left\{ w + (1-w) \frac{frameComplexity(n)}{avComplexity(n)} \right\}$$

where w is a number greater than 0.5 and less than 1.0 and avBits is a constant bit rate target.

17. The method of claim 16, wherein the frame complexity is given by the total number of bits required to code the frame using the transparent noise target, wherein average complexity is calculated using the recursive equation $$avComplexity(n)=(1-v)\cdot avComplexity(n-1)+v\cdot frameComplexity(n)$$

where v is a constant greater than 0 and less than 0.5.

18. The method of claim 14, wherein the target noise level for a frame is adjusted by linearly interpolating between the transparent noise level and the target noise curve $$tNoise[b] = K \left( \frac{noise[b]}{energy[b]} \right)^{rcWeight} energy[b]$$

where K is a constant, noise[b] are the transparent noise levels for step band b, energy[b] are the signal energies in band b and rcWeight is a constant which determines the shape of the target noise curve in the case where the target number of bits is lower than the number of bits produced by coding using the transparent noise levels.

19. The method of claim 1, wherein the quantized BMDCT coefficients are organized into a frame consisting of two (2) blocks of up to 512 coefficients, or four (4) blocks of up to 256 coefficients, or eight (8) blocks of up to 128 coefficients, wherein the coefficients from different blocks are grouped and scanned flexibly into a single array of quantized BMDCT coefficients.

20. The method of claim 1, wherein losslessly encoding the quantized BMDCT coefficients includes losslessly encoding the integers into representative symbols using fixed and variable length lossless encoding methods.

21. The method of claim 20, wherein each symbol created by the lossless encoding method can represent one or more coefficients in a given range of values and wherein for each method a unique end of block symbol is defined.

22. The method of claim 21, wherein a final bit stream is created that consists of repeated occurrences of index symbols, coefficients symbols and end of block symbols, until all coefficients are encoded, wherein the index symbol represents the particular lossless encoding method used and defines the mapping of coefficient symbols occurring between the index and the end of block symbol into coefficient values.

23. The method of claim 22, wherein the coefficient symbols are created using fixed length encoding methods derived from Pulse Code Modulation (PCM) encoders, and wherein the maximum positive PCM symbol value generated is used to represent the end of block symbol.

24. The method of claim 22, wherein the variable length lossless encoding methods are performed by Huffman encoders.

25. A method for encoding a stereo input signal having a plurality of channels, comprising the steps of:
transforming a signal from each of the plurality of channels of the stereo signal into a plurality of BMDCT frequency coefficients using a bi-orthogonal modified discrete cosine transform, wherein transforming a signal from each of the plurality of channels includes performing 2×2 orthogonal transforms on two channels of the stereo signal into independent sets of BMDCT coefficients:

$$\begin{bmatrix} L' \\ R' \end{bmatrix} = \begin{bmatrix} \cos(\theta) & \sin(\theta) \\ -\sin(\theta) & \cos(\theta) \end{bmatrix} \cdot \begin{bmatrix} L \\ R \end{bmatrix};$$

quantizing the BMDCT frequency coefficients to produce a set of integer numbers which represent the BMDCT frequency coefficients generated from each channel; and losslessly encoding the set of integer numbers into representative symbols to lower the number of bits required to represent the BMDCT frequency coefficients generated from the plurality of channels of the stereo signal.

26. The method of claim 25, wherein the 2×2 orthogonal transform varies as a function of time and frequency, and are represented as transform angles substantially between 0 and π/2.

27. The method of claim 25, wherein redundancy is removed from the two channels of the stereo signal by performing 2×2 orthogonal transforms, wherein the transform angle is calculated by taking the eigenvectors of the cross-correlation matrix calculated from the BMDCT outputs.

28. The method of claim 25, wherein irrelevant information is removed from the two channels of the stereo signal by summing or differencing the two channels above a certain minimum frequency to form one channel and setting the other channel to zero above the minimum frequency, and includes substantially simultaneously calculating a set of angles as $$\theta = \tan^{-1}(E_r/E_l)$$

where $E_r$ is the right channel (i.e. second channel) energy, and $E_l$ is the left channel (first channel) energy.

29. The method of claim 25, wherein the two channels of the stereo signal are reconstituted at the decoder by performing inverse 2×2 orthogonal transforms $$\begin{bmatrix} L \\ R \end{bmatrix} = \begin{bmatrix} \cos(\theta) & -\sin(\theta) \\ \sin(\theta) & \cos(\theta) \end{bmatrix} \cdot \begin{bmatrix} L' \\ R' \end{bmatrix}$$

where θ represents transform angles received as side information from the encoder.

30. An apparatus configured to encode a signal, comprising:
a bi-orthogonal transform module configured to transform the signal into a plurality of BMDCT frequency coefficients using a bi-orthogonal modified discrete cosine transform;
a quantization module configured-to quantize the BMDCT frequency coefficients to produce a set of integer numbers which represents the BMDCT frequency coefficients; and
a lossless encoder module configured to losslessly encode the set of integer numbers to minimize the number of bits required to represent the BMDCT frequency coefficients; and
a signal analysis module configured to divide the signal into a plurality of different window types based on a characteristic of the signal and analyze the signal to determine a set of noise targets where noise can be transparently introduced into the signal to compress the signal;
a stereo transform module configured to stereo transform the BMDCT signal frequency coefficients to eliminate all redundant and irrelevant bits from the BMDCT signal frequency coefficients;
a rate control module configured to use the noise targets received from the signal analysis module and determine the step size required to transparently allocate noise into the BMDCT frequency coefficients to meet a required bit rate per frame; and
a frame packing module configured to pack the losslessly encoded set of integer numbers, a plurality of step sizes, a plurality of transform angles, and the plurality of different window sizes into a frame to produce a formatted signal.

31. The apparatus of claim 30, wherein the different window types can be a long window, a medium window, and a short window.

32. The apparatus of claim 30, wherein the stereo transform is a 2×2 orthogonal transform.

33. The apparatus of claim 30, wherein the rate control module controls the quantization step sizes used by the quantization module.

34. The apparatus of claim 30, wherein the rate control module allocates a number of bits to the current frame based on an average complexity of the stream and the complexity of the current frame.

35. The apparatus of claim 34, wherein the complexity is measured as the number of bits which are required to code the frame transparently.

36. The apparatus of claim 30, wherein the rate control module allows relatively flexible allocation of bits to a single frame according the following equation:

$$\text{tbits} = \text{avBits}(0.75 + 0.25 \text{frameComplexity}/\text{avComplexity}),$$

where avBits is the constant bit rate target.

37. The apparatus of claim 30, wherein the bi-orthogonal transform module provides a plurality of different analysis resolution states for different signal characteristics.

38. The apparatus of claim 37, wherein the plurality of different analysis resolution states can be a long state, a medium state and a short state.

39. The apparatus of claim 38, wherein the long state contains 512 signal frequency coefficients, the medium state contains 256 signal frequency coefficients, and the short state contains 128 signal frequency coefficients.

40. The apparatus of claim 39, wherein a collection of 512 signal frequency coefficients is a sub-frame.

41. The apparatus of claim 40, wherein there are two sub-frames per frame.

42. The apparatus of claim 41, wherein the two sub-frames of a frame are losslessly encoded together.

43. The apparatus of claim 38, wherein the bi-orthogonal transform module can transition directly between the long state and the medium state and between the long state and the short state.

44. The apparatus of claim 30, wherein the quantization module quantizes the BMDCT signal frequency coefficients using pulse code modulation.

45. The apparatus of claim 30, wherein for a given step size value, the quantized BMDCT signal frequency coefficient is represented as an integer using the following formula:

$$C_q = \text{Round}(C/\text{step\_size}).$$

46. The apparatus of claim 45, wherein the step size value varies across a frequency spectrum.

47. The apparatus of claim 45, wherein the step size value is fixed within a frequency band.

48. The apparatus of claim 45, wherein the step size value for a particular frequency band is chosen so that the noise introduced into the frequency band meets the noise target specified by the rate control module.

49. The apparatus of claim 30, wherein the lossless encoder module uses variable length Huffman encoding and pulse code modulation in an adaptive way to minimize the number of bits required to represent BMDCT frequency coefficients.

50. A method for decoding a formatted signal, comprising the steps of:

decoding the coded quantized BMDCT frequency coefficients to reconstruct a quantized set of integer numbers representing BMDCT frequency coefficients of a signal, the BMDCT frequency coefficients at the decoder being represented at a reduced number of bits of precision and the BMDCT window coefficients at the encoder are configured such that the combination of forward transform and inverse transform substantially perfectly reconstruct the signal;

inverse quantizing the quantized set of integer numbers to produce the BMDCT frequency coefficients of the signal; and inverse transforming the BMDCT frequency coefficients of the signal using a bi-orthogonal modified discrete cosine inverse transform module to reproduce the signal.

51. A decoding method of claim 50, wherein the BMDCT window coefficients at the decoder are represented at a reduced number of bits of precision.

52. The method of claim 50, further comprising the steps of:

separating the formatted bitstream into side information and quantized BMDCT frequency coefficients; and inverse stereo transforming the BMDCT frequency coefficients from a pair of channels and the transformed side information to produce the BMDCT frequency coefficients of the signal.

53. An apparatus configured to decode a formatted signal, comprising:

a lossless decoder module configured to losslessly decode the formatted signal to reconstruct a quantized set of integer numbers representing the BMDCT frequency coefficients of a signal;

an inverse quantization module configured to inverse quantize the quantized set of integer numbers to produce the BMDCT frequency coefficients of the signal;

an inverse bi-orthogonal modified discrete cosine transform module configured to inverse transform the BMDCT frequency coefficients to reproduce the signal;

a frame unpacking module configured to separate the formatted bitstream into side information and quantized BMDCT frequency coefficients; and a stereo transformer configured to inverse stereo transform the BMDCT frequency coefficients from a pair of channels and the transformed side information to produce the BMDCT frequency coefficients of the signal.

* * * * *